(12) United States Patent
Valois

(10) Patent No.: US 7,134,709 B2
(45) Date of Patent: Nov. 14, 2006

(54) AUTOMATED CAR DOOR OPENING SYSTEM

(76) Inventor: Guy Valois, 7900 Bourdaloue, Laval, Quebec (CA) H7H1W2

( * ) Notice: Subject to any disclaimer, the term of this patent is extended or adjusted under 35 U.S.C. 154(b) by 0 days.

(21) Appl. No.: 11/169,037

(22) Filed: Jun. 28, 2005

(65) Prior Publication Data

US 2005/0285429 A1   Dec. 29, 2005

Related U.S. Application Data

(60) Provisional application No. 60/583,134, filed on Jun. 28, 2004.

(51) Int. Cl.
*B60J 5/04* (2006.01)

(52) U.S. Cl. ............... 296/146.11; 296/146.12; 49/209; 49/333; 49/337

(58) Field of Classification Search ............ 296/146.1, 296/146.11, 146.12, 202; 49/209, 210, 216, 49/218, 226, 208, 333, 334, 337, 41; 16/244
See application file for complete search history.

(56) References Cited

U.S. PATENT DOCUMENTS

| | | | |
|---|---|---|---|
| 2,956,836 A | 10/1960 | James et al. | |
| 3,093,406 A | 6/1963 | Barenyi | |
| 3,095,600 A | 7/1963 | Bretzner | |
| 3,275,370 A | 9/1966 | Smith | |
| 3,589,069 A * | 6/1971 | Lecomte | 49/257 |
| 4,650,241 A | 3/1987 | Motonami et al. | |
| 5,435,406 A * | 7/1995 | Gaffoglio et al. | 180/69.21 |
| 5,982,126 A | 11/1999 | Hellinga et al. | |
| 6,030,025 A * | 2/2000 | Kanerva | 296/146.12 |
| 6,086,137 A * | 7/2000 | Leschke et al. | 296/146.1 |
| 6,305,737 B1 * | 10/2001 | Corder et al. | 296/146.11 |
| 6,398,288 B1 | 6/2002 | Yuge | |
| 6,676,193 B1 * | 1/2004 | Hanagan | 296/146.11 |
| 6,808,223 B1 * | 10/2004 | Baum et al. | 296/146.12 |
| 6,820,918 B1 * | 11/2004 | DeBono | 296/146.11 |
| 6,845,547 B1 * | 1/2005 | Ham | 16/374 |
| 7,007,346 B1 * | 3/2006 | Hoffman | 16/367 |
| 2003/0213102 A1 * | 11/2003 | Ham | 16/374 |
| 2004/0187263 A1 * | 9/2004 | Hoffman | 16/367 |
| 2004/0256882 A1 * | 12/2004 | McRobert | 296/146.11 |
| 2005/0116497 A1 * | 6/2005 | DeBono | 296/146.11 |
| 2005/0166363 A1 * | 8/2005 | Hoffman | 16/244 |

* cited by examiner

*Primary Examiner*—D. Glenn Dayoan
*Assistant Examiner*—Greg Blankenship

(57) ABSTRACT

An automated car door opening system proposes a very simple yet reliable system that can easily be retrofitted on most cars. It uses the combination of a large electrically actuated inner shaft cooperating with a piston. The piston opens the car door slightly in a manner similar to the normal opening of a car door, so that the door clears the car frame and then, a combination of outward but more predominantly upward motion by the inner shaft has the door opening in an upwardly rotational motion along a vertical plane which fully opens it. The reverse process closes the door.

5 Claims, 4 Drawing Sheets

AUTOMATED CAR DOOR OPENING SYSTEM

Figure 1:
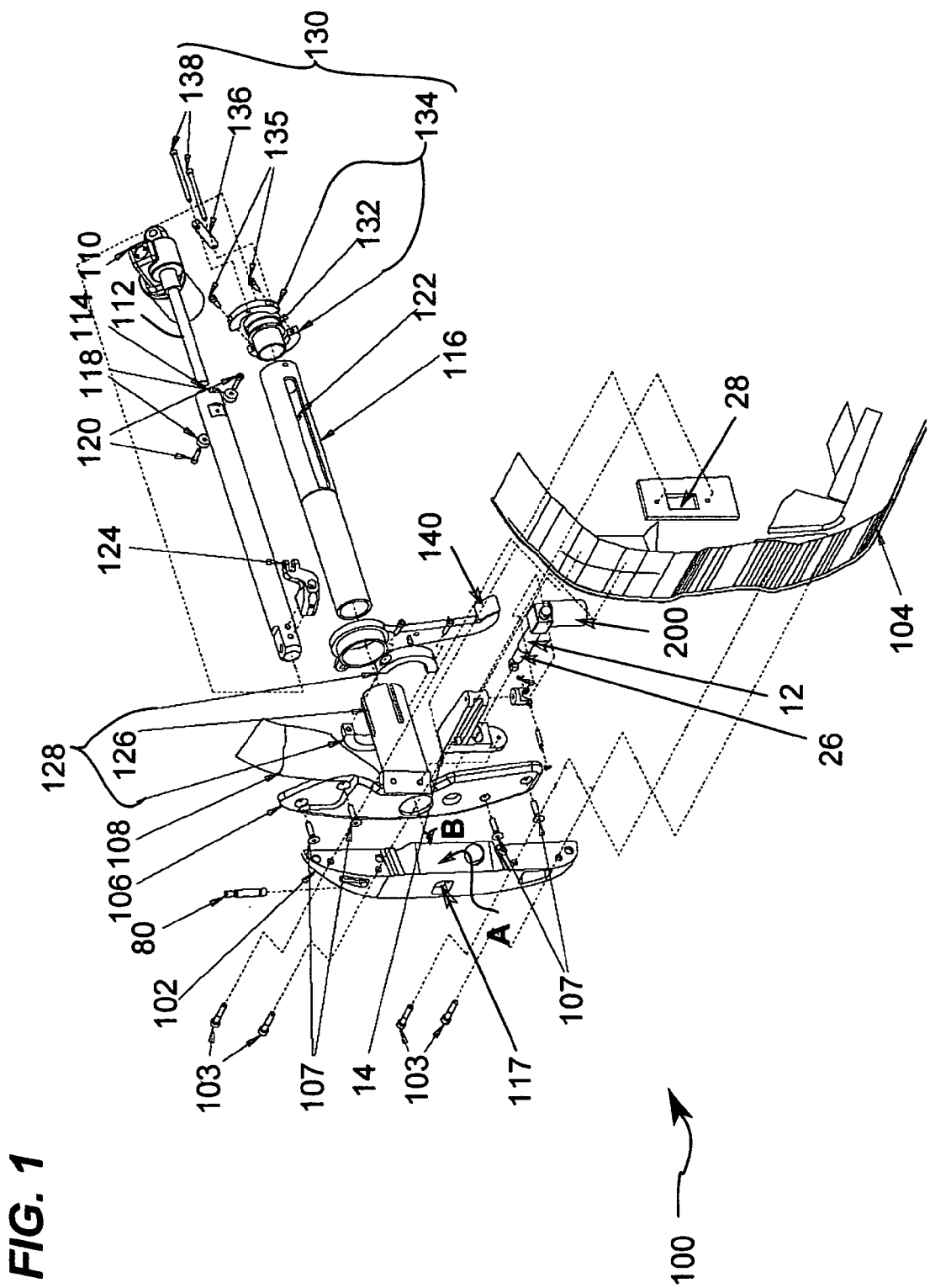

This application claims priority based on provisional application 60/583,134 filed Jun. 28, 2004

BACKGROUND OF THE INVENTION

1. Field of the Invention

The invention relates generally to automobiles but more particularly to a system that opens a car door.

2. Background of the Invention

There has been various systems developed over the years for opening car doors. Some were specifically designed for a make or model of car while other systems are more generic, some are even designed as a retrofit.

The problem with these systems is that they are very complicated, which makes them costly and hard to implement. Also, some offer unreliable mechanical elements which have proven unreliable in real world tests.

SUMMARY OF THE INVENTION

This invention is a very simple yet reliable system that can easily be retrofitted on most cars. It uses the combination of a large electrically actuated inner shaft cooperating with a piston. The piston opens the car door slightly in a manner similar to the normal opening of a car door, so that the door clears the car frame and then, a combination of outward but more predominantly upward motion by the inner shaft has the door opening in an upwardly rotational motion along a vertical plane which fully opens it. The reverse process closes the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE PREFERRED EMBODIMENT

FIG. 1 Exploded perspective view of the automated system for opening car doors with a partial car door frame.

Figure 2:
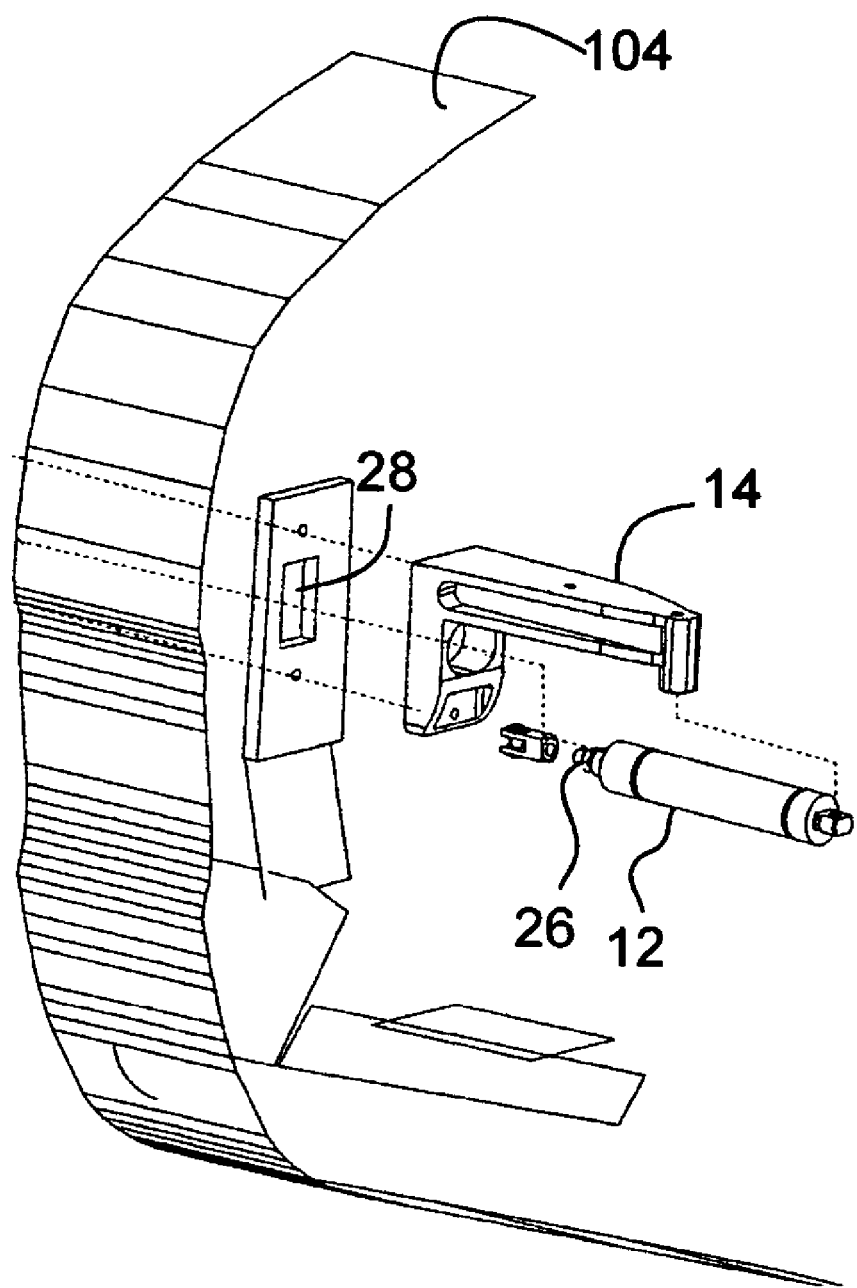

FIG. 2 Detail of the actual positioning of the pneumatic piston inside a car door frame.

Figure 3A:
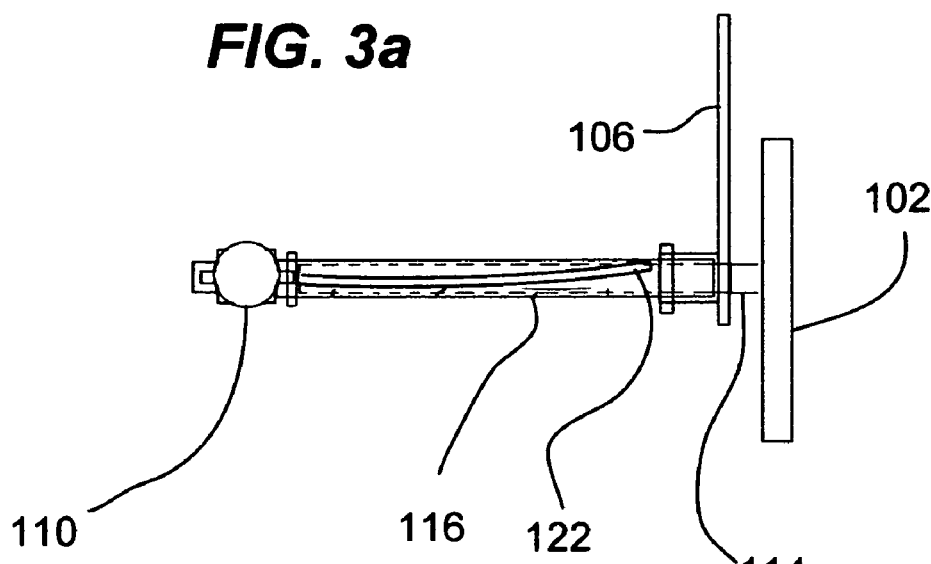
Figure 3B:
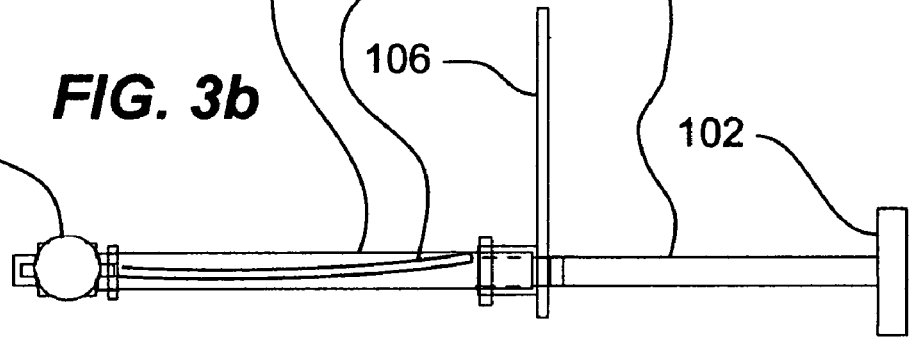

FIGS. 3ab Schematic side views of the automated system for opening car doors in the position of a closed door and in the position of an open door respectively.

Figure 4:
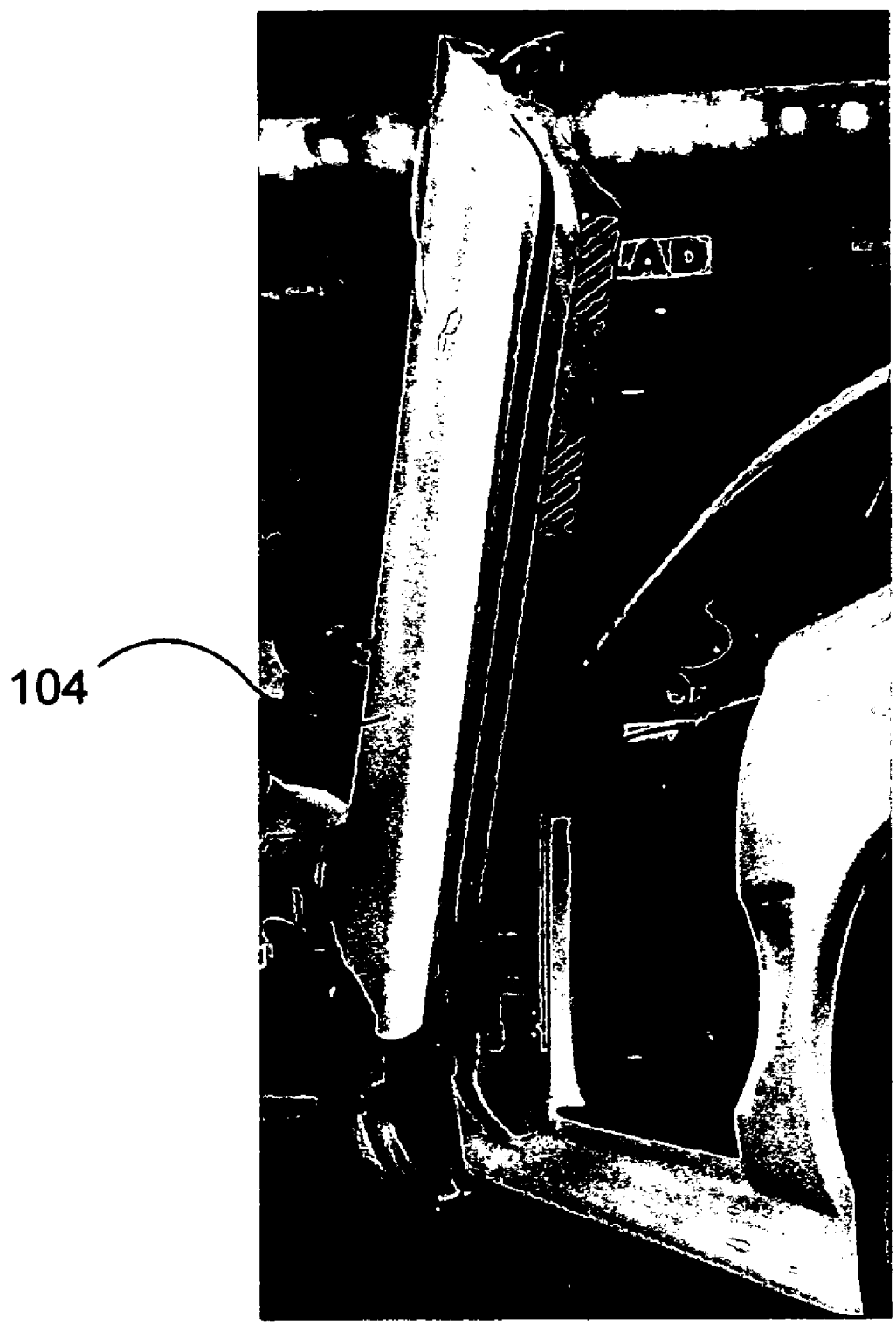

FIG. 4 Perspective view of an open door.

DETAILED DESCRIPTION OF THE PREFERRED EMBODIMENT

An automated car door opening system (100) has a rotating beam (102) which is mechanically fastened to the inside of a car door (104) on face << A >> by way of rotating beam mechanical fasteners (103). It should be understood that the exact size and configuration of the rotating beam (102) is adapted to the size and configuration of the car door frame (104) it is to be fastened to and that such inside of car door (104) shapes vary from model to model. Face << B >> of the rotating beam (102) makes contact with a fixed beam (106) which is mechanically fastened to a pillar (108) which is part of a car body (as seen on FIG. 4). by way of fixed beam mechanical fasteners (107)

Rotation of the rotating beam (102) occurs when a motor (110) actuates a worm screw (112) which linearly moves an inner shaft (114) which fits within an outer shaft (116) and with which it cooperates telescopically. Recent advances in automotive parts and accessories allow for the use of pneumatic and hydraulic means. Although at this point in time it is still preferable to use an elctric motor to actuate a worm screw, it is very conceivable that pnematic or hydraulic means could be considered mechanical equivalents in this context. Also, the worm screw could be replaced by a piston and still fall within the scope of this invention.

The motor (110) is fixedly attached to the outer shaft (116) by a mounting assembly (130) which consists of a ring (132) and a ring collar (134), with ring collar mechanical fasteners (135), and a back retainer (136), with retainer mechanical fasteners (138). The inner shaft (114) is guided as it protracts by casters (118) rotationally attached with mechanical fasteners (120) to the inner shaft (114). The outer shaft has a pair of curves (122) (only one visible, the other being diametrically opposed) cut through along part of its length and it is within those curves (122) that the casters (118) travel.

The inner shaft's end (115) fits inside the rotating beam (102) at location (117) and is held in place by inner shaft mechnical fastener (80). The inner shaft's end (115) has a curved bracket (124) mechanically fastened to it and which will be explained later.

The outer shaft (116) is partially fitted inside a tube (126) which uses a tightening collar (128) to secure the outer shaft (116) within the tube (126). The tube (126) extends integrally from the fixed beam (106).

In some car model, the emergency brake is actuated by a foot pedal (140) which can be in the way of the outer shaft (116). This is remedied by modifying the foot pedal (140) with a ring (142) encircling the tube(126).

As briefly described earlier, the first step in opening the car door (104) is to have a piston (12) opening the car door (104) slightly in a manner similar to the normal opening of a car door (104). This part of the the invention is described in a pending application by this inventor and is described as follows: a piston (12) mechanically fastened within a mounting bracket (14). The piston's rod (26) is pivotally attached to the curvec bracket (124) described earlier. The course of the piston's rod (26) passes through an opening (28) in the car door (104). An electric motor (200) actuates a worm screw (not shown) in a fashion similar to worm screw (112) in order to protract the piston's rod (26). All that is necessary is for the door to open by a small angle of about 4 degrees to sufficiently clear the car frame.

The rest of the door opening operation goes as follows:

The inner shaft (114) protracts outwardly but also in a sight twisting fashion as the casters (118) follow the curves (122). This curving produces a rotation in the rotating beam which results in the upward rotational motion of the car door (104). Reversing the process will of course result in the closing of the door. A PC Board (not shown) contains all of the inteligence required for processing the steps involved in opening and closing the car door which involves unlocking and unlatching of the door (104) which is a process that varies in each car make and model and only requires routine modifications in order to be compatible with this automated car door opening system (100).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An automated car door opening system comprising:
    a rotating beam mechanically fastened to the inside of a car door by way of rotating beam mechanical fasteners;
    a car body comprised of a pillar;
    a fixed beam mechanically fastened to said pillar by way of fixed beam mechanical fasteners;
    a motor to actuate rotation of said rotating beam by way of a worm screw moving an inner shaft linearly;
    said inner shaft fitting within an outer shaft with which it cooperates telescopically;
    said motor being fixedly attached to said outer shaft by a mounting assembly;
    said inner shaft being guided, as it protracts, by casters rotationally attached with mechanical fasteners to said inner shaft;
    said outer shaft having a pair of curves cut through along part of the length of said outer shaft;
    said casters traveling within said curves;
    an inner shaft's end fitted inside said rotating beam;
    said inner shaft's end having a curved bracket mechanically fastened to it;
    said outer shaft being partially fitted inside a tube;
    said tube extending integrally from said fixed beam;
    a piston to open said car door at an angle wherein said door rotates about a vertical axis.

2. An automated car door opening system as in claim 1 wherein:
    said mounting assembly further comprised of a ring and a ring collar with ring collar mechanical fasteners and a back retainer with retainer mechanical fasteners.

3. An automated car door opening system as in claim 1 wherein:
    said curves being diametrically opposed.

4. An automated car door opening system as in claim 1 wherein:
    said tube using a tightening collar to secure said outer shaft within said tube.

5. An automated car door opening system as in claim 1 wherein:
    said piston opening said car door by 4 degrees.

* * * * *